US012507043B2

(12) United States Patent
Rex

(10) Patent No.: US 12,507,043 B2
(45) Date of Patent: *Dec. 23, 2025

(54) SINGLE-MESSAGE ELECTRONIC PRODUCT AND SERVICE FULFILLMENT

(71) Applicant: Peter L Rex, Bellevue, WA (US)

(72) Inventor: Peter L Rex, Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/742,514

(22) Filed: Jun. 13, 2024

(65) Prior Publication Data

US 2025/0056192 A1  Feb. 13, 2025

Related U.S. Application Data

(63) Continuation of application No. 17/243,361, filed on Apr. 28, 2021, now Pat. No. 12,041,517.

(60) Provisional application No. 62/704,227, filed on Apr. 28, 2020.

(51) Int. Cl.
*H04W 4/14* (2009.01)
*G06Q 30/0601* (2023.01)
*H04M 1/72433* (2021.01)

(52) U.S. Cl.
CPC .......... *H04W 4/14* (2013.01); *G06Q 30/0633* (2013.01); *H04M 1/72433* (2021.01)

(58) Field of Classification Search
CPC . H04W 4/14; G06Q 30/0633; H04M 1/72433
See application file for complete search history.

(56) References Cited

U.S. PATENT DOCUMENTS

| 11,803,874 B2 * | 10/2023 | Bebawy | G06Q 30/0244 |
| 2016/0117744 A1 * | 4/2016 | Oayda | G06Q 30/016 |
| | | | 705/26.43 |
| 2022/0292517 A1 * | 9/2022 | Mimassi | G06F 21/32 |

* cited by examiner

*Primary Examiner* — Farid Seyedvosoghi
(74) *Attorney, Agent, or Firm* — Richard T. Black; FisherBroyles, LLP

(57) ABSTRACT

At least one computer-readable medium on which are stored instructions that, when executed by one or more processing devices, enable the one or more processing devices to perform a method. The method includes the steps of providing a first contact number accessible to an electronic device having an associated second contact number, receiving at the first contact number from a user via the electronic device an identifier of a request for a business transaction, based on the identifier and the second contact number, determining at least one criterion for fulfilling the business transaction, generating a response to the request, the response including a description of the at least one criterion, and transmitting the response to the electronic device.

10 Claims, 4 Drawing Sheets

SINGLE-MESSAGE ELECTRONIC PRODUCT AND SERVICE FULFILLMENT

COPYRIGHT NOTICE

This disclosure is protected under United States and/or International Copyright Laws. © 2024 PETER REX. All Rights Reserved. A portion of the disclosure of this patent document contains material which is subject to copyright protection. The copyright owner has no objection to the facsimile reproduction by anyone of the patent document or the patent disclosure, as it appears in the Patent and/or Trademark Office patent file or records, but otherwise reserves all copyrights whatsoever.

PRIORITY CLAIM

This application is a continuation of U.S. patent application Ser. No. 17/243,361, which application claims priority from U.S. Provisional Application Ser. No. 62/704,227 filed Apr. 28, 2020, the entirety of which is hereby incorporated by reference as if fully set forth herein.

BACKGROUND

The ordering of goods and services using electronic devices, such as smartphones, via applications ("apps") installed thereon has become commonplace. However, doing so typically and inconveniently requires that a user download the application, log into the application, set up an account and learn how to use the application.

DRAWING FIGURES

DETAILED DESCRIPTION

Figure 1:
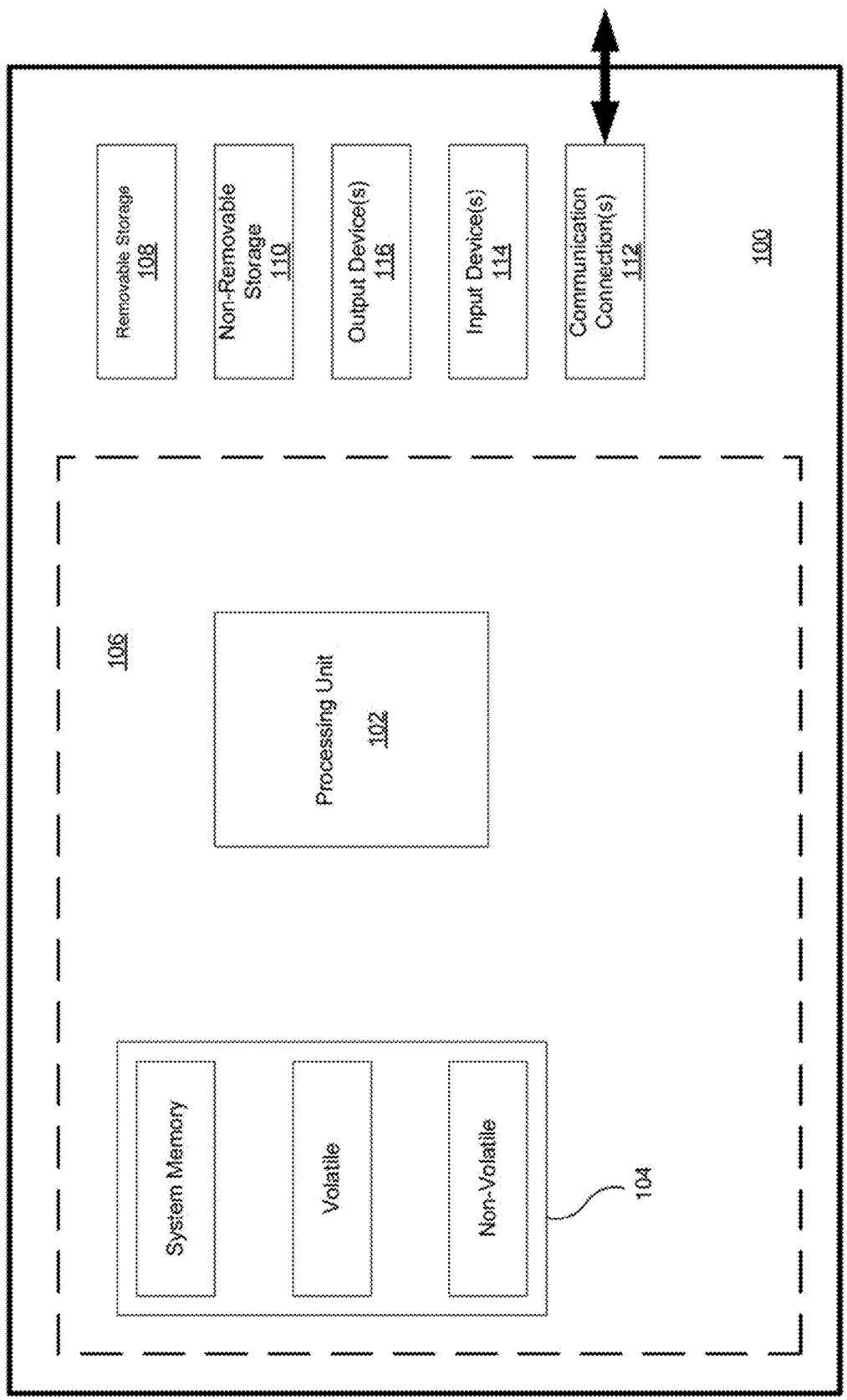
FIG. 1 is a schematic view of an exemplary operating environment in which an embodiment of the invention can be implemented.

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Embodiments of the invention may be described in the general context of computer-executable instructions, such as program modules, being executed by a processing device having specialized functionality and/or by computer-readable media on which such instructions or modules can be stored. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

With reference to FIG. 1, an exemplary system for implementing an embodiment of the invention includes a computing device, such as computing device 100, which, in an embodiment, is or includes a smartphone. The computing device 100 typically includes at least one processing unit 102 and memory 104.

Depending on the exact configuration and type of computing device, memory 104 may be volatile (such as random-access memory (RAM)), nonvolatile (such as read-only memory (ROM), flash memory, etc.) or some combination of the two. This most basic configuration is illustrated in FIG. 1 by dashed line 106.

Additionally, the device 100 may have additional features, aspects, and functionality. For example, the device 100 may include additional storage (removable and/or non-removable) which may take the form of, but is not limited to, magnetic or optical disks or tapes. Such additional storage is illustrated in FIG. 1 by removable storage 108 and non-removable storage 110. Computer storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

The device 100 may also include a communications connection 112 that allows the device to communicate with other devices. The communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, the communication media includes wired media such as a wired network or direct-wired connection, and wireless media such as acoustic, radio-frequency (RF), infrared, cellular and other wireless media. The term computer-readable media as used herein includes both storage media and communication media.

The device 100 may also have an input device 114 such as keyboard, mouse, pen, voice-input device, touch-input device, etc. Further, an output device 116 such as a display, speakers, printer, etc. may also be included. Additional input devices 114 and output devices 116 may be included depending on a desired functionality of the device 100.

Figure 2:
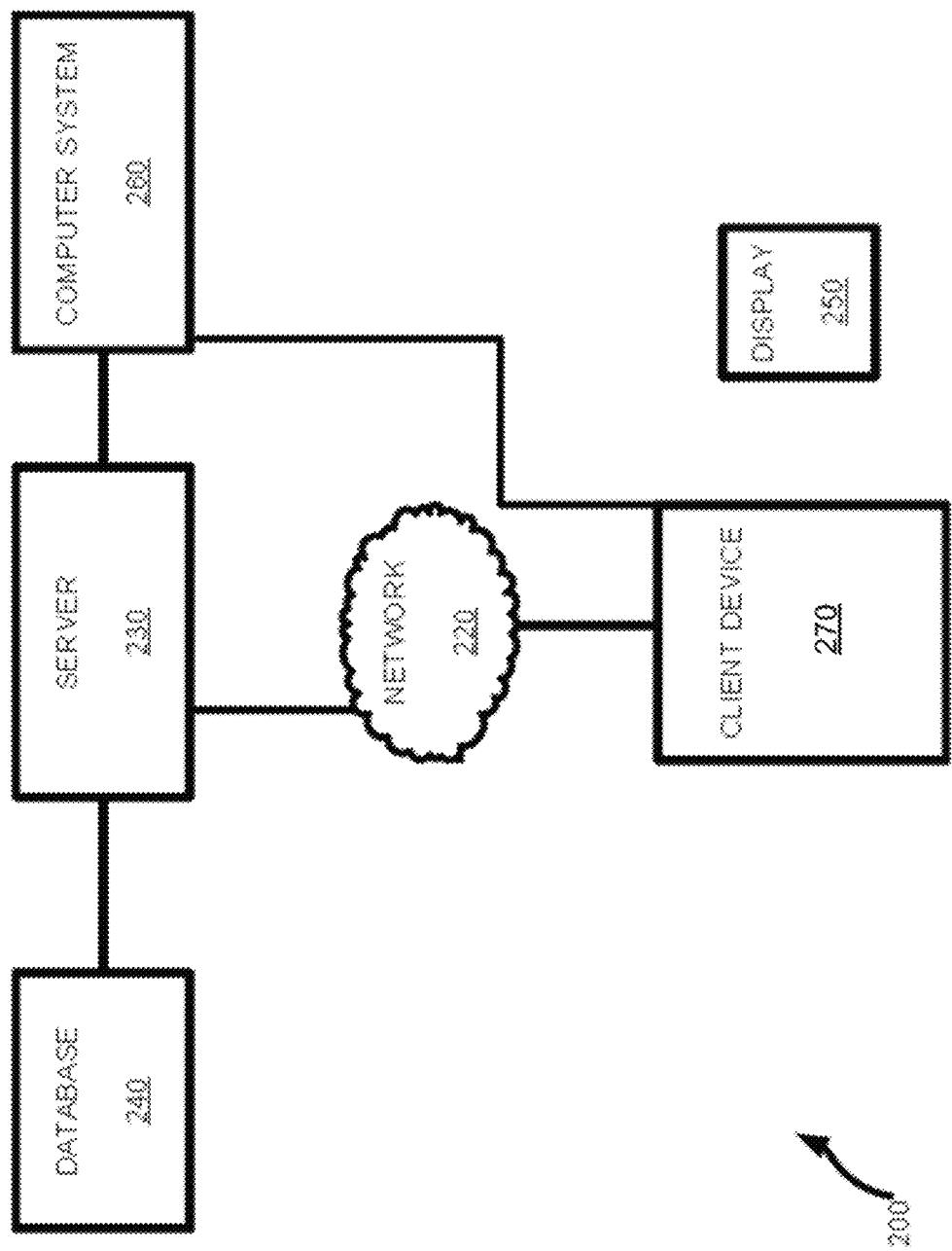
FIG. 2 is a functional block diagram of an exemplary operating environment in which an embodiment of the invention can be implemented.

Referring now to FIG. 2, an embodiment of the present invention may take the form, and/or may be implemented using one or more elements, of an exemplary computer network system 200 that, in an embodiment, includes a server 230, database 240 and computer system 260. The system 200 may communicate with an electronic client device 270, such as a personal computer or workstation, tablet or smartphone, that is linked via a communication medium, such as a network 220 (e.g., the Internet), to one or more electronic devices or systems, such as server 230. The server 230 may further be coupled, or otherwise have access, to a database 240 and a computer system 260. Although the embodiment illustrated in FIG. 2 includes one server 230 coupled to one client device 270 via the network 220, it should be recognized that embodiments of the invention may be implemented using one or more such client devices coupled to one or more such servers.

The client device 270 and the server 230 may include all or fewer than all of the features associated with the device 100 illustrated in and discussed with reference to FIG. 1. The client device 270 includes or is otherwise coupled to a computer screen or display 250. The client device 270 may be used for various purposes such as network- and local-computing processes.

The client device 270 is linked via the network 220 to server 230 so that computer programs, such as, for example, a short message service (SMS) application, running on the client device 270 can cooperate in two-way communication with server 230. The server 230 may be coupled to database 240 to retrieve information therefrom and to store information thereto. Database 240 may have stored therein data (not shown) that can be used by the server 230 and/or client device 270 to enable performance of various aspects of embodiments of the invention. The data stored in database 240 may include, for example, information identifying customers, goods/services previously requested by such customers and providers of those goods/services. Additionally, the server 230 may be coupled to the computer system 260 in a manner allowing the server to delegate certain processing functions to the computer system. In an embodiment, most or all of the functionality described herein may be implemented in a desktop or smartphone application that may include one or more executable modules. In an embodiment, the client device 270 may bypass network 220 and communicate directly with computer system 260.

One or more embodiments include a method of receiving and accepting work requests in the field of general contracting/property services and ordering goods for delivery to a location. In an embodiment, a customer purchases services or goods by sending a single short message service (SMS) message, sending a single voice memo, or speaking a single voice command. Using the text or voice data provided directly by the customer, combined with keyword- and/or voice-recognition technology, machine learning and proprietary historical data, the customer's need is identified with a high degree of certainty. With the addition of location data, local labor and material cost indices, shipping cost data, and cost-of-goods data, the customer's need are fulfilled with minimal cost and maximum efficiency without anything more than a single one-time text/voice command sent over SMS. The customer is not required to provide a code, PIN number or any other authorizing/authenticating/identifying information other than perhaps the customer's phone number.

For example, if the customer orders services, the services are assigned a price, scheduled to a calendar, and executed as a service contract. A customer wants his carpet cleaned and has ordered this service before at his home. The customer texts "clean carpet" to a predetermined number. An embodiment assumes he means the service is to be performed at his home and as soon as possible because such an arrangement has in the past been the customary response to this request. The customer then receives an immediate reply saying, "A professional is being sent in 20 minutes to your home at 1232 Glenn Road, for a cost of $100. If this is not what you want, reply 'NO'. You will be charged upon completion".

One or more embodiments may employ the following technologies: SMS, Voice-to-text software, Microphone hardware built in to phone or similar device, Machine learning, and GPS.

In a system according to an embodiment, a customer desiring a good/service can express intent to order the good/service by sending a simple SMS message in a native text messaging user interface on client device 270 such as, for example, a mobile smartphone. The customer can begin the process by sending an SMS text message to a specific phone number monitored by the server 230 and designated for order-relevant communications. Next, the customer's phone number can be tagged by the server 230 to indicate its correlation with the specific order that the customer requested. If the customer has previously used the service provided by an embodiment, his basic information will be known by the server 230 and will better facilitate order fulfillment. If the customer is requesting a good/service that the customer has never previously requested or has otherwise never used the service before, the server 230 can use SMS communication to ask the customer for needed information, such as, for example, the specific good/service desired, the party to whom the customer wishes to supply the desired good/service and minimum or maximum charges that the customer is willing to incur to acquire the good/service. The server 230 can assume that any text message coming from the customer's number is from the same customer and with regard to the most recently placed order. During the period of time after order placement and before the order is completed, the customer can also communicate, manage, and take key actions purely over SMS if they choose, without ever logging into an application or a website.

Figure 3:
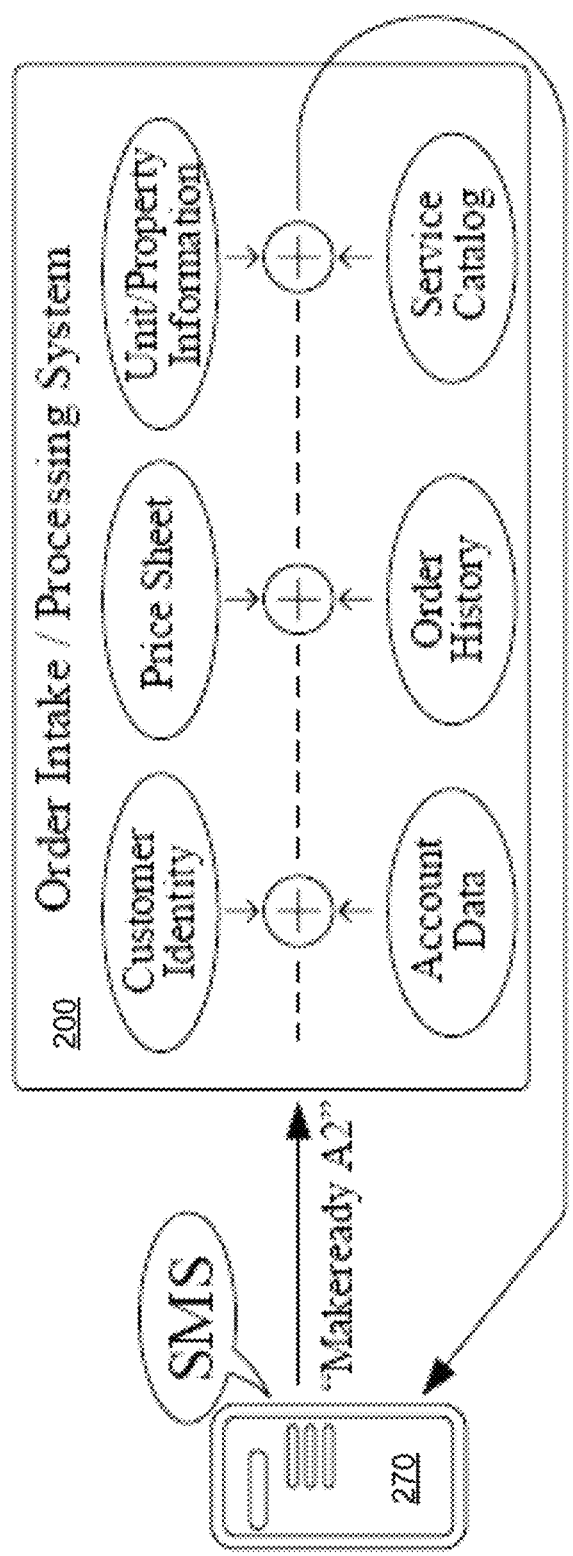
FIG. 3 is a schematic diagram illustrating communication between a customer and request fulfillment system according to an embodiment of the invention.
Figure 4:
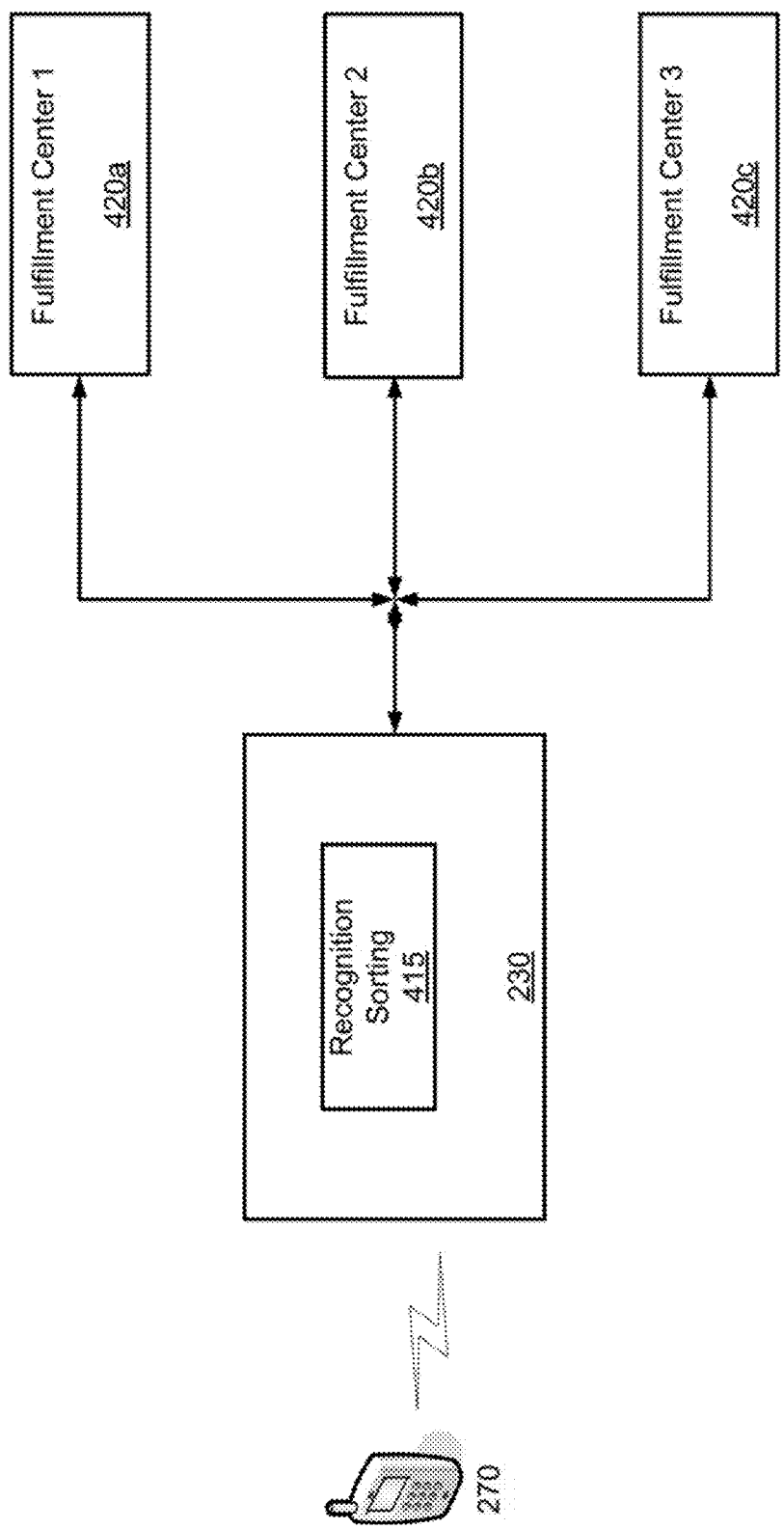
FIG. 4 is a functional block diagram of an exemplary operating environment in which an embodiment of the invention can be implemented.

Referring to FIG. 4, and in an embodiment of the invention, a customer initiates an order for a good or service by sending a single SMS message including text and/or a voice recording from a client device 270 to server 230 using a designated SMS number associated with server 230. In this embodiment, a recognition sorting application 415 executed by the server 230 monitors each SMS message incoming from client devices 270 and, based on one or more characteristics associated with the customer and/or message, routes the order associated with the message to an appropriate fulfillment center 420 for order processing. In this embodiment, the recognition sorting application 415 may route the request for order processing through wired or wireless means to a particular fulfillment center 420 based on one or more characteristics that may include one or more keywords, textual or part of a voice recording, in the text message that indicate the type of good/service requested and that are recognized by artificial intelligence associated with the recognition sorting application. As best illustrated in FIG. 3, the server 230 may also select a particular fulfillment center 420 based on the customer's identity, account history, order history, information characterizing the property, if any, to be serviced, as well as prices of goods/services/materials/supplies required to fulfill the customer request. The routing and sorting functions may be performed on respective different servers or on the same server such as server 230. In an embodiment, the routing and sorting functions are cloud-based services that also integrate with the service request and fulfillment system.

By way of example, and referring to FIG. 3, a customer named John owns an apartment building called Briarwood with a unit A2 requiring servicing (e.g., cleaning, painting, etc.) prior to a new tenant moving into the unit. John sends a short, simple text message or voice command (e.g., "Makeready A2" as illustrated) using client device 270 to a phone number associated with server 230 and dedicated to accepting order inputs. John's phone number may be recognized by the system 200 and John's information, such as name, address, previously requested tasks, etc., is retrieved. If the phone number a customer is sending his request from has never before been used to place an order, the system 200 can request GPS location data from client device 270 so that location-based pricing data can be pulled and the order can be fulfilled.

The system 200 correlates transaction criteria such as, for example, John's customer data, pricing data, account data, property/customer order history, service catalog information, respective locations of the unit and potential service providers to set up the service appointment and provide to John a detailed order summary. John receives an alert that his order has been placed along with a detailed description of the order such as transaction charges, service appointment date/time, etc. John may be told that they can reply "NO" within a certain amount of time in order to cancel the order in case the order was by accident or the order description does not meet his expectations.

An embodiment provides the collection and annotation of data from SMS or voice inputs to build a proprietary machine-learned model for the ordering of goods or services. The combination of location data, SMS or voice input, order history, and predictive analytics can be used to accurately capture the intent of a customer seeking to order goods or services.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. At least one non-transitory computer-readable medium on which are stored instructions that, when executed by one or more processing devices, enable the one or more processing devices to perform a method, the method comprising the steps of:
   providing a first contact number accessible to an electronic device having an associated second contact number;
   receiving at the first contact number from a user via the electronic device an identifier of a request for a business transaction;
   based on the identifier and the second contact number, determining at least one criterion for fulfilling the business transaction;
   generating a response to the request, the response including a description of the at least one criterion; and
   transmitting the response to the electronic device.

2. The medium of claim 1, wherein the identifier is a single identifier.

3. The medium of claim 1, wherein the identifier comprises a short message service message.

4. The medium of claim 1, wherein the identifier comprises a voice memo.

5. The medium of claim 1, wherein the user is not required to provide a code with the identifier.

6. The medium of claim 1, wherein the user is not required to provide a personal identification number with the identifier.

7. The medium of claim 1, wherein the at least one criterion comprises pricing data.

8. The medium of claim 1, wherein the at least one criterion comprises user order history.

9. The medium of claim 1, wherein the at least one criterion comprises a location at which the business transaction is to be performed.

10. The medium of claim 1, wherein the at least one criterion comprises a location of a service provider to fulfill the business transaction.

* * * * *